Oct. 27, 1964

E. L. KARLSON 3,153,935

PRESSURE TRANSDUCER

Filed June 6, 1961

INVENTOR.
ESKIL L. KARLSON

BY John W. Hoag

ATTORNEY

Oct. 27, 1964
E. L. KARLSON
3,153,935
PRESSURE TRANSDUCER
Filed June 6, 1961
2 Sheets-Sheet 2
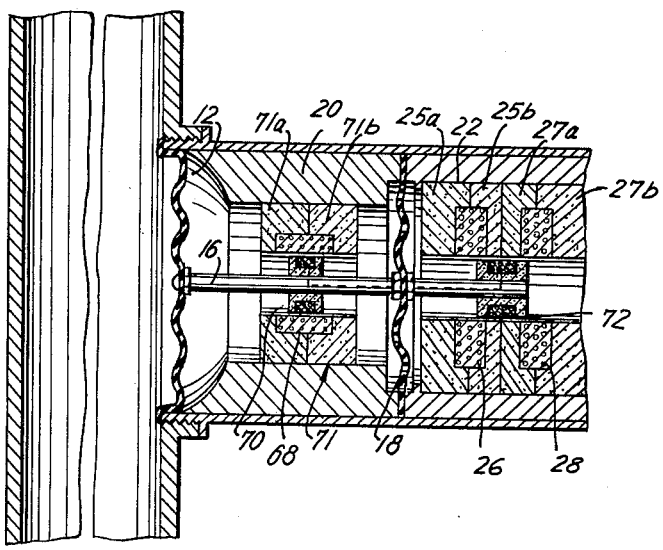
FIG. 2
FIG. 2A
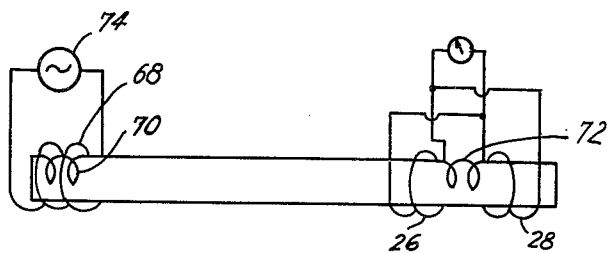
INVENTOR.
ESKIL L. KARLSON
BY John W. Hoag
ATTORNEY 3,153,935
PRESSURE TRANSDUCER
Eskil L. Karlson, 43 Westover Lane, Stamford, Conn.
Filed June 6, 1961, Ser. No. 115,130
12 Claims. (Cl. 73—398)

This invention relates to apparatus for measuring pressure, as, for example, the pressure of fluid flowing in a conduit.

An object of the invention is to provide such apparatus which is more sensitive than pressure measuring devices of the prior art and has a faster response to changes in pressure.

Another object of the invention is to provide such apparatus which is very compact and adapted for use in locations which are hard to get at.

An important advantage of the invention is the fact that it senses the pressure at the surface of the fluid body or moving stream and not at a remote point as in prior art devices.

The invention will best be understood if the following description is read in connection with the drawings, in which FIGURE 1 is a side elevation, partly in cross-section, showing one embodiment of the invention;

FIGURE 2 is a view similar to FIGURE 1, showing another embodiment of the invention;

FIGURE 2A is a schematic view showing the interrelation of the coils and the A.C. power source shown in FIGURE 2;

Figure 1:
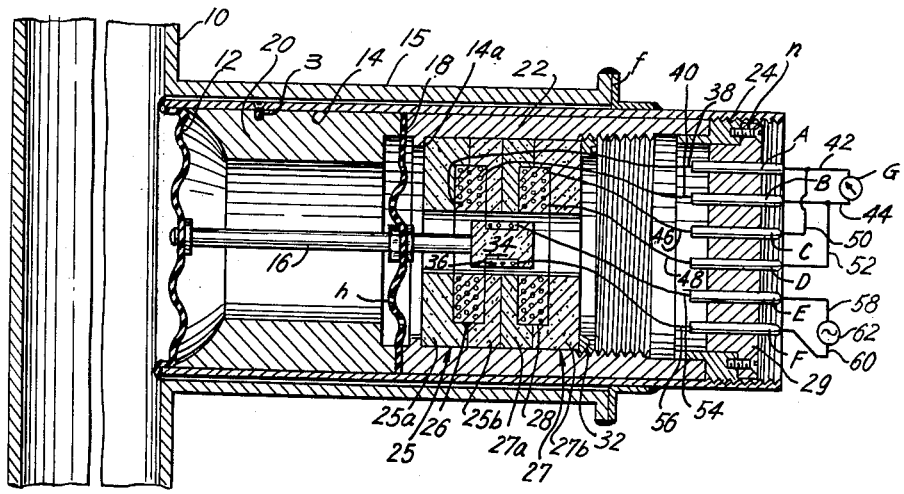

In FIGURE 1 the numeral 10 identifies a fluid conduit. In accordance with my invention a small portion of the conduit is in effect replaced by the accordion pleated diaphragm 12, which is extensible in response to fluid pressure. This is accomplished by connecting to conduit 10 a tubular member 14, which may be very small, on the order of ¼" in diameter, for example, one end of which supports, and is closed by, diaphragm 12. In order to standardize apparatus embodying my invention a T-conduit 15 may be added, coupled to a container or conduit containing the fluid the pressure of which is to be measured; a tubular member 14 may be inserted in the T-conduit 15, and the annular space between the outer surface of member 14 and the inner surface of member 15 may be sealed in any suitable way, as, for example, by a welding flange $f$ (FIG. 1). A tubular member 14 of standard size may then be used in member 15 regardless of the diameter of the member 15.

A rod 16 projects from sensing diaphragm 12 axially of tubular member 14, and a cross member 18, which may be of various kinds such for example as a web or an air pervious diaphragm, is employed to support and center the rod within member 14 while leaving it free to reciprocate axially of member 10. As shown herein, member 18 is a fluted and extensible member similar to diaphragm 12, capable of moving with rod 16 as it reciprocates while continuing to support and center the rod, and holes "$h$" are provided to make it air pervious. The periphery of member 18 is clamped between a ring 20, inserted into member 14 and secured therein as by screw 3, and a second ring 22 which is also inserted into member 14, and is held in abutting relation to ring 20 by an externally threaded lock ring 24 which engages an interiorly threaded surface portion of member 14.

Within and concentric with ring 22 are annular rings 25 and 27 of magnetic material, such for example as compressed powdered iron held together with a suitable binder such for example as an epoxy resin or ceramic binder. Ring 25 comprises parts 25a and 25b the opposed faces of which are partly cut away to receive between them an annular coil 26. Similarly ring 27 comprises parts 27a and 27b the opposed faces of which are partly cut away to receive between them an annular coil 28. Coil 26 and 28 are preferably narrow and separated only a short distance by the combined width of ring parts 25b and 27a. Ring part 25a abuts against and is positioned within the ring 22 by the circular internal flange 14a. The successive ring parts abut against one another and are held in close relation by lock ring 32, which is exteriorly threaded to engage the interiorly threaded portion of ring 22. The rings 25 and 27 position and space apart the coils 26 and 28 and provide them with a highly magnetic field in which flux changes are very rapid, thus making coils 26 and 28 very sensitive to small movements of coil 36.

On the free end of rod 16 is an I-shaped coil holder or core 34 of magnetic material around which is wound the coil 36 which is coaxial with rod 16. Coil 36 and its holder 34 are small enough to reciprocate within the space at the center of rings 25 and 27 and axially of the coils 26 and 28.

Stationary coil 26 has its ends connected by leads 38 and 40 to terminals A and B respectively, extending through connector 29, which in turn are connected by leads 42 and 44 across the terminals of an A.C. volt meter G, calibrated in terms of pressure in relation to the position of moving coil 36. Similarly, stationary coil 28 has its ends connected by leads 46 and 48 to terminals C and D, respectively, which are connected by leads 50 and 52 to leads 42 and 44, respectively. Connector 29 is inserted in the outer end of tubular member 14 and is locked in position as by screws $n$ extending from it into lock ring 24.

Coil 36, which moves axially of tubular member 14, with rod 16, has its ends connected by leads 54 and 56 to terminals E and F, respectively, which in turn are connected by leads 58 and 60 across the opposite terminals of the alternating current generator 62.

Coils 26, 28 and 36 are positioned in relation to the length of rod 16 so that at zero pressure within conduit 10 coil 36 will be positioned as shown in FIGURE 1 balanced between coils 26 and 28. Therefore at zero pressure residual voltage in coil 26 is balanced out by coil 28, and A.C. volt meter G will read zero. Any pressure in conduit 10 will move coil 36 outwardly within tubular member 14 thus increasing the current induced in coil 28 and reducing the current induced in coil 26 and the extent of this imbalance will be shown by volt meter G.

The sensitivity of the apparatus shown in FIGURE 1 may be increased somewhat by adding to the means shown in FIGURE 1 means for continually reciprocating or "jittering" rod 16 a short distance, thus continually inducing current in coils 26 and 28, and modifying the current thus obtained by additional movement of coil 36 due to movement of diaphragm 12 in response to pressure change within conduit 10. The result is a device which is more sensitive to small pressures and small changes in pressure. The reciprocation, i.e., jitter, of rod 16 keeps diaphragm 12 in motion with the result that changes less than are required to overcome the inertia of diaphragm 12 and move it and rod 16 from a standing still position are shown by the voltmeter G, which is calibrated to show the imbalance of coils 26 and 28.

As shown in FIGURE 2 two coils 70 and 72 are carried by the rod 16 spaced apart axially of the rod and connected in series (see FIGURE 2A). Coil 72 is positioned in the center space of coils 26 and 28 and the surrounding and spacing rings 25a, 25b, 27a and 27b, similarly to coil 36 in FIGURE 1. Leads from a source of alternating current to coil 72 are not required since it is energized from coil 70, which is the secondary of a transformer which also includes a closed circuit comprising the primary coil 68 and the alternating current generator 74.

Coils 26 and 28 may be connected to terminals of a connector member 29 as described in connection with FIGURE 1.

Within and concentric with ring 20 is the annular split ring 71, which like rings 25 and 27 described in connection with FIGURE 1 are of magnetic material. Ring 71 comprises parts 71a and 71b, the opposed faces of which are partly cut away to receive between them the annular coil 68, which, as described above and illustrated in FIGURE 2A, is the primary of a transformer 68–70.

Coil 68 is made long in relation to the length of coil 70 so that the voltage output of coil 70 will be constant for all operating positions of diaphragm 12.

Figure 3:
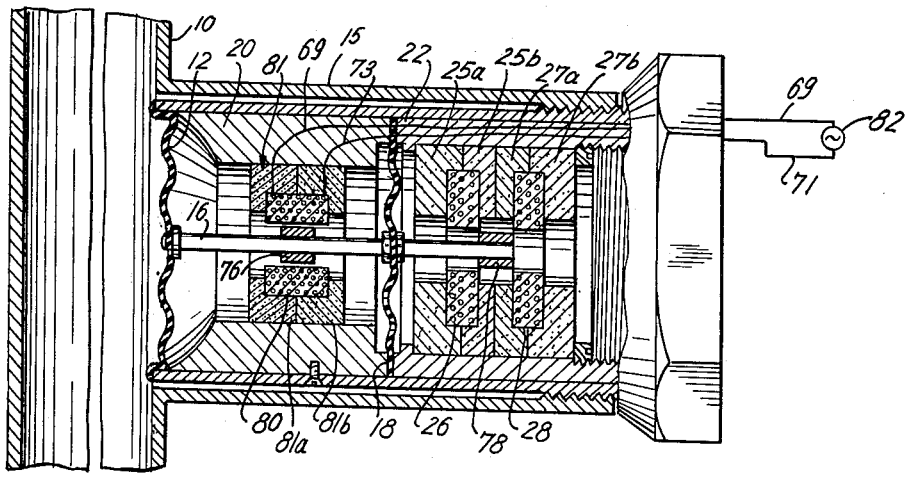
FIGURE 3 is a view similar to FIGURES 1 and 2 but showing another, somewhat modified, embodiment of the invention.

In the embodiment of the invention shown in FIGURE 3 permanent magnets 76 and 78 are carried in spaced relation on rod 16. Coil 80 is disposed around magnet 76 and is connected by leads 69 and 73 across the terminals of an alternating current generator 82, and co-acts with magnet 76 to cause rod 16 to reciprocate axially of coils 26 and 28. Coil 80 may be termed the driving coil since the alternations of current within it acting on magnet 76 causes rod 16 to jitter and move magnet 78 the movements of which induce current in coils 26 and 28 which is modified by movements of rod 16 and magnet 78 caused by pressure responsive movements of diaphragm 12, and the imbalance of coils 26 and 28 resulting from pressure change may be indicated by a voltmeter G, as illustrated in FIGURE 1.

Within and concentric with ring 20 is the annular ring 81 made of magnetic material, and comprising parts 81a and 81b the opposed faces of which are partly cut away to receive between them the annular coils 80. Coil 80 is made long in relation to the length of magnet 76 so that the magnet will have constant amplitude of reciprocation for all operating positions of diaphragm 12.

There has thus been provided a pressure transducer apparatus in which the above-stated objects are realized in a thoroughly practical manner.

What I claim is:

1. Apparatus for measuring fluid pressure which comprises, a pressure sensing member which is part of the wall of a conduit of moving fluid, a rod attached at one end to said pressure sensing member and movable with the sensing member in response to pressure of fluid within said conduit exerted on said member, a pair of stationary induction coils connected in counter-balancing relation to a current measuring device, means comprising magnetic material surrounding each of the induction coils and spacing them from one another, a member mounted on said rod arm and movable as a core axially of said induction coils and adapted by its movement to induce electric current in said stationary coils, said current measuring device being calibrated in terms of pressure as a function of the position of said member with respect to said stationary coils.

2. The apparatus claimed in claim 1 in which the magnetic material means surrounding each induction coil comprises a plurality of annular rings formed of compressed powdered iron with a binder of epoxy resin, disposed in side by side relation with their opposed faces cut away to receive the coils.

3. The apparatus claimed in claim 1 in which the stationary coils are narrow in relation to the movable current inducing member and are spaced apart a distance less than the length of said member by magnetic material which entirely surrounds said stationary coils, said magnetic material being in the form of two pairs of annular rings disposed in side by side relation, the opposed faces of each pair being partly cut away to receive between them said current inducing members respectively.

4. The apparatus claimed in claim 1 in which the member mounted on the rod and adapted by its movement to induce electric current in said stationary coils, is a magnet.

5. Apparatus for measuring fluid pressure which comprises, a pressure sensing member which is part of the wall of a fluid container, a rod attached at one end to said flexible member and movable with the sensing member in response to pressure of fluid within said container exerted on said member, a coil on the rod, and means for energizing the coil with alternating current, a pair of stationary induction coils connected in counter-balancing relation to a current measuring device, and magnetic material entirely encasing each of said coils, and comprising two annular ring members of compressed powdered magnetic material held together with a suitable binder, each ring member comprising two annular parts with their opposed faces partly cut away to receive one of said coils between them, said current measuring device being calibrated in terms of pressure as a function of the position of said moving coil with respect to said stationary coils.

6. The apparatus claimed in claim 5 in which means are also provided for continually reciprocating said rod and the means carried by said rod for inducing current in said stationary coils independently of movement of the rod responsive to movements of said pressure sensing member.

7. The apparatus claimed in claim 5 in which the means for inducing current in said stationary coils comprises, a first coil mounted on the rod and movable with the rod as a core axially of the induction coils, a second coil mounted on the rod and electrically connected to the first coil by said rod, said second coil being the secondary of a transformer comprising a primary connected to a source of alternating current.

8. The apparatus claimed in claim 5 in which the means carried by the rod for inducing current in said stationary coils is a coil connected in series with the secondary of a transformer also carried by the rod and surrounded by a primary coil which is connected to a source of alternating current and magnetic material means which is encasing said primary coil.

9. The apparatus claimed in claim 5 in which a magnet is disposed on said rod, and a coil is provided surrounding said magnet and energized by a source of alternating current.

10. The apparatus claimed in claim 5 in which a magnet is disposed on said rod and a coil is provided surrounding said magnet and energized by a source of alternating current, and a second magnet is carried by the rod for inducing current in said stationary coils.

11. Apparatus for measuring pressure in a fluid container which comprises, a tubular member adapted at one end to be joined to said container and to communicate with the interior of said container through an opening provided in the wall of the container, a pressure sensitive diaphragm supported adjacent the end of said tubular member which is joined to said container, said diaphragm member thus becoming in effect a portion of the wall of said container, a rod connected at one end to said diaphragm and projecting axially of said tubular member, means for supporting and centering said rod within said container without preventing said arm from reciprocating axially of the tubular member, a pair of annular coils disposed within said tubular member and connected in counter-balancing relation to a current-measuring device calibrated in terms of fluid pressure as a function of movements of said pressure-sensitive diaphragm and said arm, said pair of coils being supported within said tubular member by a pair of annular rings of magnetic material disposed in side by side relation, each ring comprising two parts having their opposed faces partly cut away to receive a coil between them, means including a source of alternating current for creating a magnetic field centrally of the coils, and means reciprocal with said rod axially of said coils and adapted to cut the lines of force of said magnetic field and thus induce current in said coils individually in proportion to its position relative to said coils.

12. The apparatus claimed in claim 11 in which, the member mounted on said rod and adapted by its movement to induce electric current in said stationary coil is a magnet, a second magnet is positioned on said rod remote from said induction coils, and a coil is provided extending around said second magnet and connected to a source of alternating current, said coil being longer than said second magnet and disposed within a recess provided in an annular ring of magnetic material surrounding said second magnet.

References Cited in the file of this patent

UNITED STATES PATENTS

| | | |
|---|---|---|
| 2,368,278 | Warshaw | Jan. 30, 1945 |
| 2,586,010 | Divoll | Feb. 19, 1952 |
| 2,788,664 | Coulbourn et al. | Apr. 16, 1957 |
| 3,039,069 | Shipes | June 12, 1962 |